Sept. 6, 1938.  E. J. BUBLITZ  2,129,563
ORNAMENTAL TREE
Filed June 9, 1936
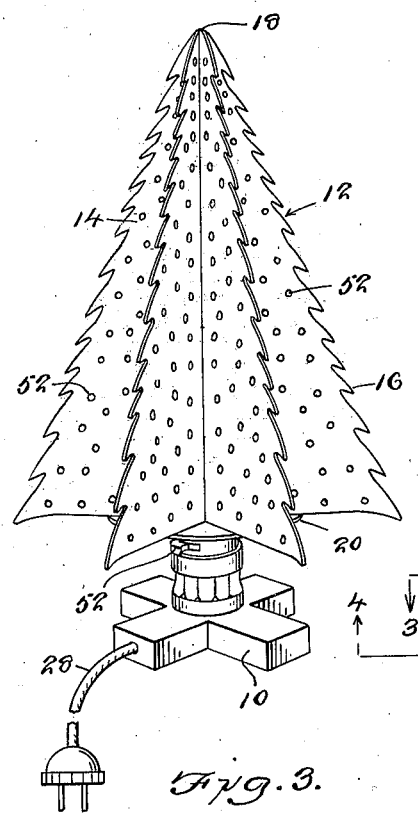
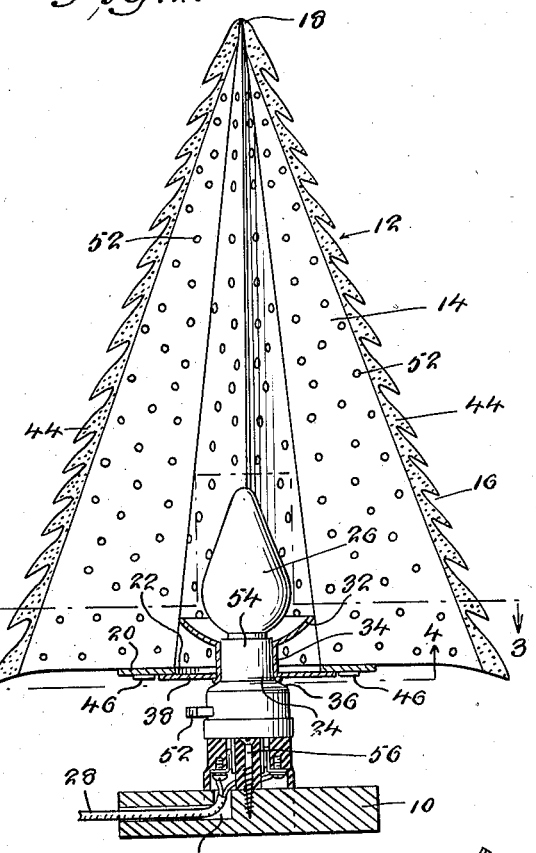
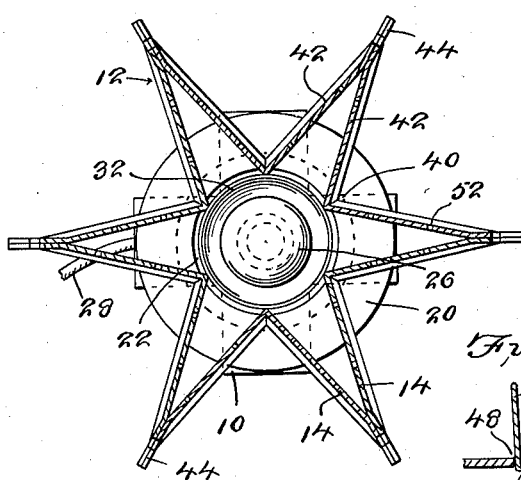
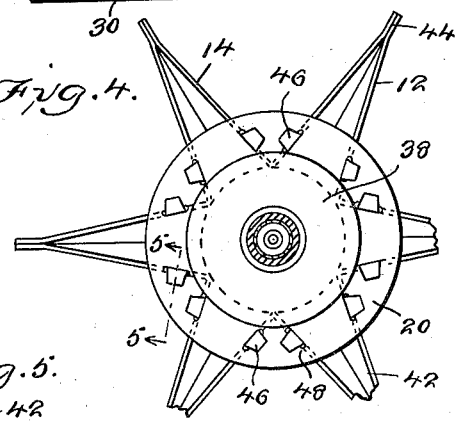
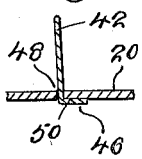
Edward J. Bublitz
INVENTOR
BY Victor J. Evans & Co.
HIS ATTORNEYS Patented Sept. 6, 1938

2,129,563

UNITED STATES PATENT OFFICE 2,129,563

ORNAMENTAL TREE

Edward J. Bublitz, Chicago, Ill.

Application June 9, 1936, Serial No. 84,355

5 Claims. (Cl. 41—15)

My invention relates to ornamental devices, and has among its objects and advantages the provision of an illuminated tree.

In the accompanying drawing:

Fig. 1 is a perspective view of a tree embodying my invention;

Fig. 2 is a sectional view of the tree;

Fig. 3 is a sectional view along the line 3—3 of Fig. 2;

Fig. 4 is a sectional view along the line 4—4 of Fig. 2 with certain parts broken away; and Fig. 5 is a sectional view along the line 5—5 of Fig. 4.

In the embodiment selected to illustrate my invention, I make use of a base 10 upon which a tree 12 is mounted. The tree is designed to simulate an evergreen. In cross-section, the tree 12 comprises a plurality of wings 14 having serrated edges 16 and converging upwardly to define the tip 18. The serrated edges 16 simulate branches which enhance the ornamental aspects of the tree as a whole.

Referring to Fig. 2, the base of the tree comprises a paper ring 20 having a central opening 22 through which a socket 24 extends. This socket supports an electric lamp 26 electrically connected with a source of current through the medium of wires 28 which pass through the bore 30 in the base 10. A reflector 32 is arranged in operative relation with the lamp 26 for deflecting light rays upwardly and includes a sleeve 34 which embraces the socket 24. This sleeve is flared at 36 to provide a flange for supporting a plate 38 bearing against the ring 20 for supporting the load of the tree.

Each wing 14 comprises two paper sheets bent at 40 to provide walls 42 arranged in converging relation and glued together along their marginal edges at 44. Thus, one sheet provides a wall for two wings. Each sheet is provided with two ears 46 at its bottom end which project through slots 48 in the ring 20 and are bent thereagainst and glued in position, as at 50 in Fig. 5.

Referring to Fig. 3, it will be noted that the tree in cross-section simulates a hollow, star-shaped configuration, and that the interior of the tree will be illuminated by reason of the lamp 26. The wings 14 are provided with perforations 52 through which light emanates, thereby increasing the ornamental feature. The outer surfaces of the wings 14 may be colored to simulate the natural color of the particular tree designed. In some cases, it may be desirable to apply a coating of white, sparkling material such as powdered or flaky mica for imitating snow.

The socket 24 is conventional so far as the electrical circuit features are concerned, and includes a conventional switch 52. The neck 54 of the socket provides a shoulder for supporting the sleeve 34, and the socket as a whole is anchored to the base 10 by a wood screw 56. The tree 12 may be lifted off the plate 38 since the opening 22 is larger than the reflector 32. When placed in position, the tree is balanced upon the plate 38 and is centered by the reflector 32. While the tree may be made of paper, the parts are effectively glued together and the arrangement of the parts provides a reinforced construction. While I have illustrated the tree as being provided with the lamp 26, illumination may be dispensed with, and exterior lighting utilized.

Without further elaboration, the foregoing will so fully explain my invention that others may, by applying current knowledge, readily adapt the same for use under various conditions of service.

I claim:

1. An ornamental tree comprising a plurality of normally upright wings radially arranged with respect to a common vertical axis, each wing comprising a pair of converging walls joined along their outer edges, each wall having its inner edge joined to the inner edge of one wall in the adjacent wing, but spaced from said common axis, and base means connected with the lower ends of the wings.

2. An ornamental tree comprising a plurality of normally upright wings radially arranged with respect to a common vertical axis, each wing comprising a pair of converging walls joined along their outer edges, each wall having its inner edge joined to the inner edge of one wall in the adjacent wing, but spaced from said common axis, and base means connected with the lower ends of the wings, the outer margins of the wings being serrated and converging upwardly in the direction of said common axis, the said joined inner edges converging upwardly in the direction of said common axis.

3. An ornamental tree comprising a plurality of normally upright wings radially arranged with respect to a common vertical axis, each wing comprising a pair of converging walls joined along their outer edges, each wall having its inner edge joined to the inner edge of one wall in the adjacent wing, but spaced from said common axis, and base means connected with the lower ends of the wings, the outer margins of the wings being serrated and converging upwardly in the direction of said common axis, the said joined inner edges converging upwardly in the direction of said common axis, said base means being provided with an opening, the said joined inner edges being arranged in the form of a circle of sufficient diameter to house illuminating means projected through said opening.

4. An ornamental tree comprising a plurality of normally upright wings radially arranged with respect to a common vertical axis, each wing comprising a pair of converging walls joined along their outer edges, each wall having its inner edge joined to the inner edge of one wall in the adjacent wing, but spaced from said common axis, and base means connected with the lower ends of the wings, said walls being perforated and the joined inner edges of the walls being arranged in the form of a circle of sufficient diameter to house an electric light, said base means being provided with an opening through which the electric light may be inserted.

5. An ornamental tree comprising a plurality of normally upright wings radially arranged with respect to a common vertical axis, each wing comprising a pair of converging walls joined along their outer edges, each wall having its inner edge joined to the inner edge of one wall in the adjacent wing, but spaced from said common axis, tabs carried by the lower ends of said walls, and base means connected with said tabs.

EDWARD J. BUBLITZ.